March 6, 1951  F. S. CREIGHTON  2,544,221
VISOR FOR SPECTACLES
Filed May 2, 1949  2 Sheets-Sheet 1
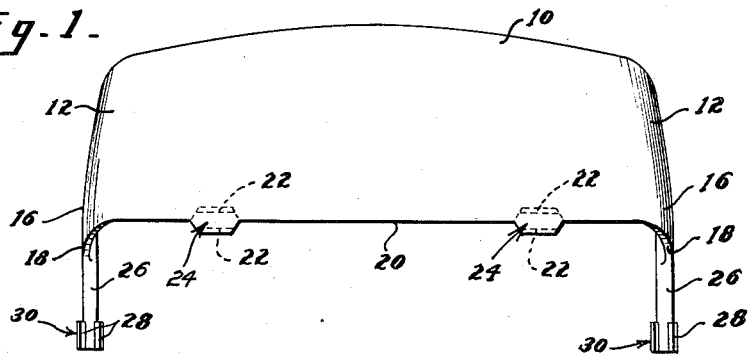
Fig. 1.
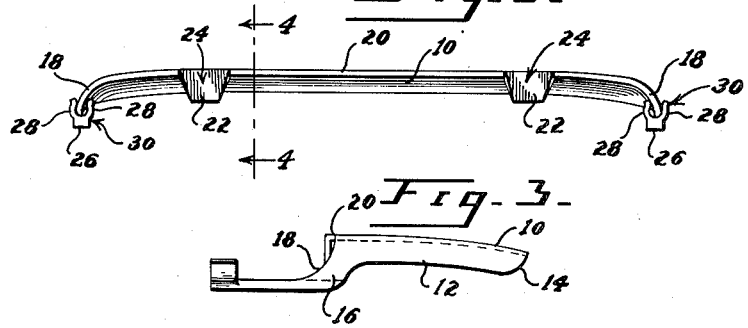
Fig. 2.
Fig. 3.
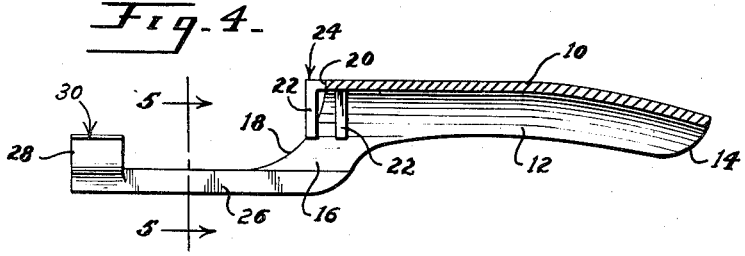
Fig. 4.
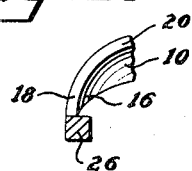
Fig. 5.
Inventor
FRANCIS S. CREIGHTON
By H. Faye Martin
his Attorney March 6, 1951 — F. S. CREIGHTON — 2,544,221
VISOR FOR SPECTACLES
Filed May 2, 1949 — 2 Sheets-Sheet 2

INVENTOR.
FRANCIS S. CREIGHTON
BY
his ATTORNEY

Patented Mar. 6, 1951

2,544,221

UNITED STATES PATENT OFFICE 2,544,221

VISOR FOR SPECTACLES

Francis S. Creighton, Elmira, N. Y.

Application May 2, 1949, Serial No. 90,794

5 Claims. (Cl. 2—13)

This invention relates to a visor for spectacles and has for its primary object to shade the eyes of the user.

Another object is to preserve the visibility of the lenses in inclement weather by protecting them from the deposit thereon of water in the form of rain or snow.

A further object is to facilitate the mounting and demounting of the visor on a pair of conventional spectacles.

Still another object of the invention is to provide a shield made of light weight material of a color or colors restful to the eyes, and easily adjustable to the face.

Another object of this invention is to provide a shade or visor that can be used for more than one purpose such as protection from the top and sides against rays of strong light and the effects of wind and storm such as: water in the form of rain and snow, and particles of dust and dirt.

A distinct advantage of my invention is the full vision provided the wearer, but with protection for the eyes from above and from the sides.

The above and other objects may be attained by employing this invention which embodies among its features, an elongated shield which is preferably curved transversely and has at each end a downwardly curved supporting and shielding flange, a pair of longitudinally spaced spectacle frame engaging clips projecting inwardly from the body adjacent one of its longitudinal edges, legs projecting downwardly and outwardly from the ends of the flanges adjacent the clips, parallel supporting arms fixed to the lower ends of the legs and projecting rearwardly from the body and spectacle temple engaging clips carried by the arms adjacent the ends thereof remote from the shield.

In the drawings—

Figure 1 is a top plan view of a spectacle visor embodying the features of this invention, Figure 2 is a rear end view of the visor illustrated in Figure 1, Figure 3 is a side view of the visor, Figure 4 is an enlarged sectional view taken substantially along the line 4—4 of Figure 2, and Figure 5 is a fragmentary sectional view taken substantially on the line 5—5 of Figure 4.

Figure 6:
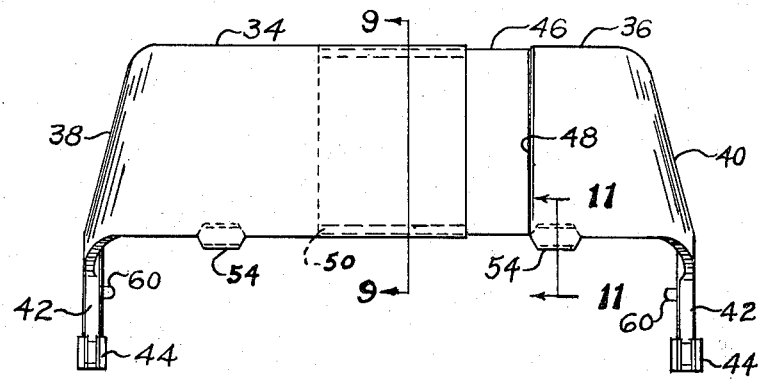
Figure 6 is a top plan view of a modified form of spectacle and face visor embodying the features of this invention.

Referring to the drawings in detail this improved visor comprises an elongated shield 10 which in its preferred form is molded from a suitable plastic material which is preferably opaque. The shield 10 curves transversely as illustrated and has formed integrally therewith at opposite ends downwardly curving flanges 12 which are upwardly curved at their forward ends as at 14 so that their edges merge into the front edge of the shield 10. Projecting downwardly and rearwardly from the ends of the flanges 12 are legs 16 to which are attached the bow engaging arms to be more fully hereinafter described. The rear edges of the legs 16 curve upwardly as at 18 and merge into the rear edge 20 of the shield 10.

Carried by the rear edge 20 of the shield 10 are longitudinally spaced pairs of inwardly extending parallel tongues 22 forming spectacle frame engaging clips designated generally 24 in which the lens frames of a pair of spectacles (not shown) are received.

Carried by the lower edges of the legs 16 and extending rearwardly therefrom are arms 26 which lie in spaced parallel relation beneath the bows or temples of a pair of conventional spectacles. These arms 26 are coextensive in length and carried at the end of each arm 16 remote from the shield 10 is a pair of spaced cooperating yielding tongues 28 forming a clip designated generally 30.

As will be readily understood from the drawings the clips 24 open downwardly while the clips 30 open upwardly so that when the device is in use the clips 24 receive the upper portions of the rims which encircle the lenses and the arms 26 lie beneath the bows or temples with the latter being received in the clips 30. In this way the visor will be securely supported in proper position on the spectacles. Obviously the tongues 22 and 28 may be formed integrally with the shield 10 and arms 26 respectively and each pair of tongues forming the clips 24 and 30 are preferably so spaced from each other as to yieldingly grip the spectacle frame and the temples or bows, thus frictionally holding the visor against accidental disconnection from the spectacles. At the same time the user may at will remove the visor and employ the spectacles in the conventional manner.

Figure 7:
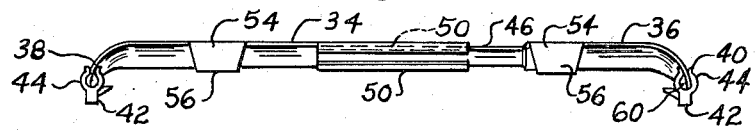
Figure 7 is the rear view of the visor illustrated in Figure 6.
Figure 8:
Figure 8 is a side view in elevation showing the curvature of the visor.
Figure 10:
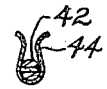
Figure 10 is a sectional view through one of the bow clips.
Figure 9:
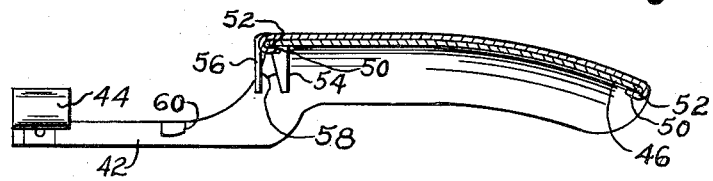
Figure 9 is an enlarged sectional view taken substantially along the line 9—9 of Figure 6.

In the modified form of the invention disclosed in Figures 6 through 10 inclusive, the shield designated generally 32 comprises a pair of cooperating shield members 34 and 36 which are provided with downwardly curved side shields 38 and 40 respectively. Formed at the lower edge of each side shield 38 and 40 is a rearwardly extending arm 42 carrying adjacent its rear end an upwardly opening substantially U-shaped spectacle bow engaging clip 44.

Formed on the end of the shield member 36 remote from the side shield 40 is a tongue 46 which is slightly narrower than its respective shield member 36 and is offset downwardly as at 48 for a distance substantially equal to the thickness of the stock from which the shield members 34 and 36 are formed. Formed along the longitudinal side edges of the shield member 34 adjacent the end thereof remote from its side shield 38 are downwardly and inwardly curving guide flanges 50 which form guide channels 52 (Fig. 9) for opposite side edges of the tongue 46. It will thus be seen that the shield 32 is extensible and hence may be made to fit spectacles of differing widths.

Carried by the shield members 34 and 36 adjacent the edge nearest the arms 42 are spectacle frame or lens engaging clips designated generally 54 each of which comprises a pair of spaced downwardly projecting legs or tongues 56 which form between them a downwardly opening spectacle frame or lens receiving recess 58. Projecting inwardly from each arm 42 intermediate the ends thereof is a lug 60 which serves as a stop which engages the under side of an adjacent spectacle bow effectively to prevent the visor from tilting upwardly and accidentally disengaging the clips 54 from the spectacle frame.

Figure 11:
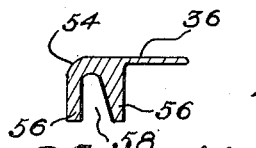
Figure 11 is an enlarged sectional view taken substantially on the line 11—11 of Figure 6, showing in detail one of the spectacle rests of the visor.

In using the modified form of the invention illustrated in Figures 6 through 11 inclusive, the shield 32 is adjusted to fit the spectacles with which it is to be worn by moving the shield members 34 and 36 inwardly or outwardly as required to bring the arms 42 into register with the spectacle bows or temples. The clips 54 are then placed on the upper edges of the frames or lenses so that the legs 56 thereof straddle the frames or lenses. The shield is then rocked so as to advance the arms 42 toward the bows or temples of the spectacles until the latter are received in the clips 44 and in this way the shield 32 will be supported on the spectacles to perform its function as an eye shield.

This application is a substitute application and continuation-in-part of my copending application Serial No. 66,600 now abandoned.

What is claimed is:

1. A visor for spectacles comprising an elongated shield, a pair of longitudinally spaced downwardly opening spectacle frame engaging clips carried by one longitudinal edge of the shield, spaced parallel arms carried by the shield and projecting substantially perpendicularly from the edge of the shield carrying the clips and upwardly opening spectacle bow or temple engaging clips carried by the arms adjacent the ends thereof remote from the shield to cooperate with the frame engaging clips in holding the visor on a pair of spectacles.

2. A visor for spectacles comprising an elongated shield, a pair of longitudinally spaced downwardly opening spectacle frame engaging clips carried by one longitudinal edge of the shield, a downwardly extending side shielding flange carried by the shield at each end thereof, spaced substantially parallel arms carried by the flanges adjacent the lower ends thereof, said arms extending perpendicular to the longitudinal axis of the shield and upwardly opening spectacle bow or temple engaging clips carried by the arms adjacent the ends thereof remote from the shield for cooperation with the frame engaging clips in holding the visor on a pair of spectacles.

3. A visor for spectacles comprising an elongated shield, a pair of longitudinally spaced downwardly opening spectacle frame engaging clips carried by one longitudinal edge of the shield, a downwardly extending side shielding flange carried by the shield at each end thereof, downwardly and outwardly extending legs carried by the shielding flanges adjacent the ends thereof adjacent the clips on the shield, parallel arms carried by the lower ends of the legs and projecting perpendicular to the longitudinal axis of the shield and upwardly opening bow or temple engaging clips carried by the arms adjacent the ends thereof remote from the legs for cooperation with the frame engaging clips in holding the visor on a pair of spectacles.

4. A visor for spectacles comprising an elongated longitudinally extensible shield, a pair of longitudinally spaced downwardly opening spectacle frame engaging clips carried by one longitudinal edge of said shield, spaced rearwardly extending arms carried by the shield adjacent opposite ends thereof and upwardly opening spectacle bow or temple engaging clips carried by the arms adjacent the ends thereof remote from the shield.

5. In a visor for spectacles, a pair of cooperating shield members, means carried by adjacent ends of the shield members for extensibly coupling said shield members, a downwardly opening spectacle frame or lens engaging clip carried by each shield member, an arm carried by each shield member at the end thereof remote from the adjacent shield member, said arms projecting perpendicularly from the shield members, and an upwardly opening spectacle bow engaging clip carried by each arm adjacent the end thereof remote from its respective shield member.

FRANCIS S. CREIGHTON.

REFERENCES CITED

The following references are of record in the file of this patent:

UNITED STATES PATENTS

| Number | Name | Date |
|---|---|---|
| 485,448 | Beilmann | Nov. 1, 1892 |
| 542,015 | Goodman | July 2, 1895 |
| 2,224,560 | Wentz | Dec. 10, 1940 |
| 2,342,377 | Small | Feb. 2, 1944 |

FOREIGN PATENTS

| Number | Country | Date |
|---|---|---|
| 118,094 | Australia | Feb. 2, 1944 |